United States Patent Office 3,779,953
Patented Dec. 18, 1973

3,779,953
FLAME-RETARDANT POLYURETHANES CONTAINING 1,2,5,6 - TETRABROMO-3,4-DIHYDROXYHEXANE
Anthony Joseph Papa, Saint Albans, W. Va., and William Robert Proops, Claymont, Del., assignors to Union Carbide Corporation, New York, N.Y.
No Drawing. Filed Aug. 16, 1971, Ser. No. 172,295
Int. Cl. C08g 22/08, 51/58
U.S. Cl. 260—2.5 AJ
10 Claims

ABSTRACT OF THE DISCLOSURE

Polymer compositions normally susceptible to burning are rendered flame-retardant by the incorporation therein of 1,2,5,6 - tetrabromo - 3,4 - dihydroxyhexane. In particular, a higher melting stereoisomeric form of the latter compound provides essentially scorch-free, self-extinguishing polyurethane foams which exhibit a good overall combination of physical and mechanical properties.

---

This invention relates to flame-retarded solid organic polymer compositions and their method of manufacture. More particularly, the invention relates to flame-retarded polymeric cellular products including polyurethane foams having a specific bromine-containing aliphatic alcohol incorporated therein.

It is known that polyurethane polymers are manufactured by the reaction of polyfunctional isocyanates and polyfunctional active hydrogen-containing compounds such as in particular polyethers and polyesters containing free hydroxyl groups and that cellular products are provided by effecting the reaction in the presence of a blowing agent. Notwithstanding their many useful properties which have contributed to their acceptance for many end-use applications in the transportation, building, household and textile industries, it is recognized that an objectionable characteristic of polyurethanes, particularly when in cellular form, is their risk of flammability in applications where exposure to high temperatures and/or flame may be encountered. This problem which also exists with respect to other synthetic organic polymers such as, for example, thermosetting polyesters, polyepoxides and polystyrene, has of course received considerable attention with the result that a variety of compounds which are largely phosphorus-containing compounds and halogen-substituted organic compounds, are reported in the prior art as effective agents for reducing flammability.

An important criterion in determining the efficacy of any particular flame-retarding agent is its ability to improve flame resistance without causing substantial deleterious affect on the desirable physical and mechanical properties of the polymer. As between various types of polymers including resinous coating compositions and cellular materials ranging from flexible foams to the closed cell and more highly cross-linked rigid foams, the flexible cellular polymers are inherently more difficult to flameproof without substantially upsetting the delicate balance of their desirable physical and mechanical characteristics and open cell network. For example, in British patent specification 1,063,605, it is reported that polyurethane coating compositions of improved fire-retardant properties are provided by the incorporation therein of 3-bromo-2,2-bis(bromomethyl)propanol, 2,2 - bis(bromomethyl)-1,3-propanediol, or a mixture thereof. The brominated diol which is also referred to in the art as dibromoneopentyl glycol, has the structural formula,

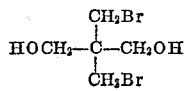

(A)

and is designated herein as Compound A. Although the aforesaid patent is not concerned with flame-retarding polyurethane foams, prior art Compound A was tested to determine its efficacy as a flame-retardant of flexible polyether polyurethane foam. The tests revealed that, although Compound A provided self-extinguishing foams, the air porosity of the foamed product was substantially less than the porosity of flexible foam which was formed in the absence of Compound A, thereby indicating that Compound A has an adverse affect on foam breathability and tends to provide tight foams. A further factor which compounds the difficulty of providing satisfactory flame-retarded flexible polyurethane foams is that such foams generally exhibit a greater tendency to ignite at temperatures lower than the combustion temperatures of rigid foams. Thus, a particular compound which may be effective in reducing the flammability of rigid foams, may be too stable at lower temperatures to be an efficient flame-retardant of flexible cellular materials.

A further problem which is especially associated with the manufacture of flame-retarded polyurethanes in general is the tendency of many flame-retardants to cause scorching. This undesirable result is most commonly associated with halogen-substituted organic flame-retardants and is often attributed to the release of hydrogen halide. Although adequate stability toward elimination of hydrogen halide appears necessary to minimize scorch, too high a degree of thermal stability will lower flame-retarding effectiveness. For example, another known bromine-containing alcohol is trans-2,3-dibromo-2-butene-1,4-diol, which has the structural formula,

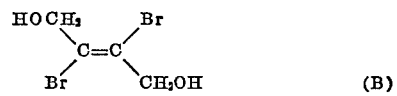

(B)

and is referred to herein as Compound B. Testing of Compound B and a flame-retardant for flexible polyurethane foam revealed that, although no apparent scorching of the foamed product had ocurred, the efficiency thereof as a flame-retardant was relatively low.

A further brominated alcohol reported in the prior art as being capable of imparting reduced flammability to polyurethanes, is 2,3-dibromopropanol, which in accordance with British patent specifications 895,966 and 889,720, respectively, is used either as such or in combination with antimony oxide. This brominated alcohol which has the formula,

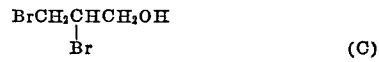

(C)

and is referred to herein as Compound C, was also tested as a flame-retardant of flexible polyurethane foam and found to exhibit the reverse combination of flame-retardancy and scorching effects as compared to the results obtained with the aforesaid Compound B. That is, whereas Compound C was effective for the purpose of imparting self-extinguishing characteristics, the foamed product was severely scorched.

It is evident, therefore, that although Compounds A, B and C are aliphatic bromohydrins (that is, acyclic hydrocarbons substituted only with bromine and hydroxyl groups) of relatively low molecular weight, they vary in overall effectiveness as flame-retardants and suffer drawbacks when used to flame-retard polyurethanes, particularly flexible foams.

It is, therefore, an object of this invention to provide organic polymers, particularly polyurethanes, including flexible cellular polymers, to which flame-retardant properties have been imparted.

Another object is to impart flame-retardant properties to flexible polyurethane foams with minimum impairment of desirable foam properties and without causing severe scorching thereof.

Another object is to provide a method for producing polymers, particularly flexible polyurethane foams, having the aforesaid characteristics.

Various other objects and advantages of this invention will become apparent to those skilled in the art from the accompanying description and disclosure.

In accordance with the present invention, the flame resistance of solid organic polymers which are normally susceptible to burning is improved by the incorporation therein of the particular bromohydrin, 1,2,5,6-tetrabromo-3,4-dihydroxyhexane. The present invention is applied with particular advantage to the preparation of flame-retarded polyurethane materials by the method which comprises reacting (1) an organic polyisocyanate, (2) an organic compound containing an average of at least two active hydrogen atoms capable of reacting with isocyanato groups, and (3) 1,2,5,6-tetrabromo-3,4-dihydroxyhexane. This reaction is usually effected in the presence of a catalyst comprising an amine. The flame-retarded polyurethanes of the present invention may be produced as flexible, semi-flexible and rigid foams (i.e., cellular polyurethanes), flexible and stiff fibers, coatings, films, elastomers and the like. In producing flame-retarded cellular polyurethanes, the aforesaid reaction of (1), (2) and (3) is carried out in the presence of a blowing or foaming agent as an additional component of the reaction mixture.

The particular bromohydrin, 1,2,5,6-tetrabromo-3,4-dihydroxyhexane, employed in accordance with the teachings of this invention has the formula,

BrCH$_2$CHBrCHOHCHOHCHBrCH$_2$Br and for convenience and brevity, it is also referred to herein as Compound I.

Various spatial arrangements of the bromine and hydroxyl substituents about the respective asymmetric carbon atoms of Compound I are readily depicted and, theoretically, ten optical and six geometric isomers are possible (that is, four $dl$ or enantiomorphic pairs and two meso modifications). The literature recognizes that Compound I can be isolated as two distinct, crystalline stereoisomeric forms characterized by their significantly different relative melting points. For example, Journal of the Chemical Society Abstracts, 64, 241 (1893) and Chemical Abstracts, 26, 4303 (1932) report 174° C. as the melting point of one isomer and 98°–99° C. and 96° C., respectively, as the melting point of the other stereoisomer. As defined and measured by the melting point determination described herein, the respective melting points of purified, analytical samples of these stereoisomers, which are designated herein as Isomer I and Isomer II, are: (1) from about 171.5° to about 172.5° C. and (2) from about 98° to about 99° C. Without wishing to be bound by any theoretical considerations and, notwithstanding indications in the aforesaid literature to the contrary, we believe that these high and low melting stereoisomers of Compound I are meso and racemic forms, respectively.

In accordance with the present invention and, from the standpoint of providing flame-retarded polymeric materials, Compound I may be employed as a mixture of stereoisomers in any relative proportion thereof or as either Isomer I or Isomer II individually. For the purpose of imparting flame-retardancy, therefore, Compound I is suitably employed as a solid which melts anywhere within the range of from about 85° C. up to about 172.5° C. On the other hand, when other properties are taken into consideration such as tendency to produce scorching, ability to provide permanently self-extinguishing polymers, processing latitude and quality of flame-retarded products, high and low melting forms of Compound I are markedly different in effectiveness. Thus, it also has been discovered that Compound I possesses a unique overall combination of properties as a flame-retardant, particularly for flexible polyurethane foams, when used as a high melting isomeric form which need not, however, be as rigorously pure as the form described herein as Isomer I. In accordance with this more specific embodiment of the present invention, essentially scorch-free, flame-retarded polyurethane foams including permanently self-extinguishing flexible polyurethane foams of good overall quality are provided by the incorporation therein of Compound I in a high melting form, that is, in a form having a melting point of at least about 120° C. When operating within this embodiment, it is preferred that Compound I have a melting point of at least about 140° to about 150° C. which is most preferably at least about 160° C. or as near to the melting point of Isomer I as may be consistent with economic considerations. As far as it is known, the apparent influence of stereochemical factors on overall effectiveness of any particular compound having asymmetric carbon atoms as a flame-retarding agent has not been reported previously.

Compound I is readily provided as the bromination reaction product of 3,4-dihydroxy-1,5-hexadiene, commonly referred to as divinyl glycol, as shown by the following Equation 1:

2Br$_2$+CH$_2$=CHCHOHCHOHCH=CH$_2$→
BrCH$_2$CHBrCHOHCHOHCHBrCH$_2$Br (1)

This reaction is usually carried out at relatively low temperatures usch as from about minus 15° C. to about plus 10° C. in the presence of a diluent. Suitable diluents are the halogen-substituted lower alkanes such as chloroform, carbon tetrachloride and methylene chloride, although other diluents which are liquid and substantially non-reactive under the aforesaid reaction conditions may be employed.

Generally, the reaction of Equation 1 proceeds to produce Compound I as a mixture of stereoisomers which mixture is useful as such in providing flame-retarded polymeric materials as described herein. When the solid reaction product is provided as a low melting form of Compound I, that is, having a melting point below about 120° C., in order to realize the aforementioned highly desirable overall combination of properties as a flame-retardant, the mixture is subjected to further treatment so as to recover Compound I in its high melting form. When in admixture with one another, the various stereoisomers of Compound I have different solubility characteristics and thus Compound I is readily separated into its high and low melting forms by recrystallization. For example, recrystallization of the mixed reaction product from chloroform provides the high melting form of Compound I, the low melting form being recovered from the filtrate. As desired, the respective forms of Compound I may be subjected to further purification by recrystallization until Isomers I and II are obtained. In view of the aforementioned unique combination of properties of the high melting form of Compound I, it is desirable to maximize the overall yield thereof. This may be accomplished in a variety of ways. For example, Isomer II is transformed to Isomer I upon standing at ambient temperatures in the presence of a catalyst such as hydrogen bromide. In order to accelerate the transformation, Isomer II may be subjected to slowly rising temperatures under thermogravimetric conditions. Additionally, Compound I in a form predominant in Isomer I can be produced as the direct product of the reaction of Equation 1 by bromination of the corresponding stereoisomer of the divinyl glycol reactant which also has asymmetric carbon atoms. The formation of the high melting form of Compound I is also favored by effecting the bromination reaction in particular solvents such as methylene chloride.

The solid organic polymers which can be rendered flame-retardant in accordance with the present invention include any normally flammable synthetic polymers which can advantageously be given a degree of flame-retardancy. Among such polymers are: polyurethanes; thermosetting polyesters; polyepoxides; resinous polymers derived from ethylenically unsaturated monomers such as ethylene, propylene, styrene, alkyl-substituted styrenes, as well as monomers which provide thermoplastic polyesters such as lower alkyl acrylates and methacrylates, vinyl acetate, and other resinous polymers well known to the art.

The proportion of 1,2,5,6 - tetrabromo-3,4-dihydroxyhexane employed depends on several factors including the degree of flame-retardancy desired, whether an additional flame-retardant is employed, the chemical composition of the polymeric material, the physical nature (i.e., cellular or non-cellular), and, with respect to cellular polymers, the nature of the cellular structure (i.e., flexible, semiflexible or rigid). Generally, Compound I is employed in an amount sufficient to provide in the polymer product, bromine in an amount from about 1 to about 20 weight percent. In providing flame-retarded cellular polyurethanes, Compound I is used in an amount sufficient to incorporate in the polymer at least about 2 and usually no more than about 10 weight percent bromine, based on the combined weight of the polyisocyanate, active hydrogen-containing reactant and Compound I. In producing self-extinguishing flexible polyurethane foams, Compound I is used in an amount sufficient to incorporate at least 2.3 weight percent bromine, expressed on the aforesaid basis, in view of the greater tendency of flexible foams to burn as compared with more rigid materials.

The polyisocyanates used in the manufacture of polyurethanes are known to the art and any such reactants are suitably employed in producing the flame-retarded compositions of this invention. Among the suitable polyisocyanates are those represented by the general formula:

$$Q(NCO)_i$$

wherein $i$ has an average value of at least two and Q is an aliphatic, cycloaliphatic or aromatic radical which can be an unsubstituted hydrocarbyl group or a hydrocarbyl group substituted, for example, with halogen or alkoxy. For example, Q can be an alkylene, cycloalkylene, arylene, alkyl-substituted cycloalkylene, alkarylene or aralkylene radical including corresponding halogen-substituted radicals. Typical examples of suitable polyisocyanates for use in preparing the flame-retarded polyurethanes of this invention are: 1,6-hexamethylene diisocyanate, 1,4-tetramethylene diisocyanate, 1-methyl-2,4-diisocyanatocyclohexane, bis(4-isocyanatophenyl)methane, phenylene diisocyanates such as 4-methoxy-1,3-phenylenediisocyanate, 4-chloro-1,3-phenylenediisocyanate, 4-bromo-1,3-phenylenediisocyanate, 5,6-dimethyl-1,3-phenylenediisocyanate, 2,4- and 2,6 - tolylene diisocyanates, crude tolylene diisocyanate, 6-isopropyl-1,3-phenylenediisocyanate, durylene diisocyanate and triphenylmethane-4,4′,4″-triisocyanate. Other suitable polyisocyanate reactants are ethylphosphonic diisocyanate and phenylphosphonic diisocyanate. Also useful are the polyisocyanates of the aniline-formaldehyde polyaromatic type which are produced by phosgenation of the polyamine obtained by acid-catalyzed condensation of aniline with formaldehyde. Polyphenylmethylene polyisocyanates of this type are available commercially under such trade names as PAPI, AFPI, Mondur MR, Isonate 390P, NCO–120, NCO–10 and NCO–20. These products are low viscosity (50–500 centipoises at 25° C.) liquids having average isocyanato functionalities in the range of about 2.25 to about 3.2 or higher, depending upon the specific aniline-to-formaldehyde molar ratio used in the polyamine preparation. Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates; and a mixture of isomeric tolylene diisocyanates with polymeric tolylene diisocyanates obtained as residues from the manufacture of the diisocyanates.

The amount of polyisocyanate employed varies slightly depending upon the nature of the polyurethane being prepared. In general, the polyisocyanates are employed in amounts that provide from 80 to 150 percent, preferably from 90 to 120 percent of the stoichiometric amount of the isocyanato groups required to react with all of the hydroxyl groups present in the other reactants of the polyurethane-producing reaction mixture, including the hydroxyl groups of Compound I, the additional polyol reactants described below and any water which may be present as a source of blowing action.

In producing the flame-retarded urethane polymers of the present invention, one or more polyols in addition to 1,2,5,6-tetrabromo-3,4-dihydroxyhexane are employed in the reaction with the organic polyisocyanate. Such additional polyols contain an average of at least two hydroxyl groups per molecule and include compounds which consist of carbon, hydrogen and oxygen and compounds which also contain phosphorus and/or halogen. Suitable classes of such active hydrogen-containing compounds are polyether polyols, polyester polyols, lactone polyols and phosphorus-containing polyols.

Among the suitable polyether polyols that can be employed are the alkylene oxide adducts of water or any of the following polyhydroxyl-containing organic compounds: ethylene glycol; diethylene glycol; propylene glycol; dipropylene glycol; trimethylene glycol; butylene glycols; glycerol; 1,2,6-hexanetriol; 1,1,1-trimethylolethane; 1,1,1 - trimethylolpropane; 3 - (2-hydroxyethoxy)-1,2-propanediol; pentaerythritol; 1,2-cyclohexanediol; sorbitol; sucrose; lactose; glycosides such as alpha-methylglucoside and alphahydroxyalkyl glucoside, fructoside and the like; compounds in which hydroxyl groups are bonded to an aromatic nucleus such as resorcinol, pyrogallol, phloroglucinol, di-, tri-, and tetra-phenylol compounds such as bis-(p-hydroxyphenyl)-methane and 2,2-bis-(p-hydroxyphenyl)-propane, and many other such polyhydroxy compounds known to the art. The alkylene oxides employed in producing polyether polyols, which are also known as poly(oxyalkylene) polyols, usually have from 2 to 4 carbon atoms and are preferably ethylene oxide, propylene oxide and any combination thereof. In the preparation of mixed poly(oxyethylene-oxypropylene) polyols, the ethylene and propylene oxides may be added to the hydroxyl-containing reactant either in admixture or sequentially.

Suitable polyester polyols for use in the manufacture of polyurethanes are the reaction products of: (1) one or more of the aforesaid polyether polyols or polyhydroxyl-containing organic compounds which are reacted with alkylene oxide to produce such polyether polyols, and (2) a polyfunctional organic carboxylic acid including aliphatic and aromatic acids. Typical examples of suitable polycarboxylic acids that can be employed in producing polyester polyols are: succinic, adipic, sebacic, azelaic, glutaric, pimelic, malonic and suberic acids; and aromatic acids such as phthalic, terephthalic, isophthalic, and the like.

Other suitable polyols for use in the manufacture of the flame-retarded polyurethanes of this invention are: lactone-based polyols prepared by reacting a lactone such as epsilon-caprolactone or a mixture of epsilon-caprolactone and an alkylene oxide with a polyfunctional initiator such as a polyhydric alcohol, an amine, or an aminoalcohol; and phosphorus-containing polyols such as the alkylene oxide adducts of phosphoric acid, polyphosphoric acids such as tri- and tetra-phosphoric acids, organo-substituted phosphoric acids such as benzenephosphoric acid and the like.

The particular polyol reactant or combination of polyols employed depends upon the end-use of the polyurethane product which in turn determines whether the product is to be provided as a flexible or rigid material. For this purpose, the polyol reactant is usually characterized by its hydroxyl number which is defined as the number of milligrams of potassium hydroxide required for the complete neutralization of the hydrolysis product of the fully acetylated derivative prepared from 1 gram of polyol or mixture of polyols. The hydroxyl number can also be defined by the equation:

$$OH = \frac{56.1 \times 1000 \times f}{M.W.}$$

wherein

OH = hydroxyl number of the polyol
$f$ = average functionality, that is, average number of hydroxyl groups per molecule of polyol
M.W. = average molecular weight of the polyol.

In producing rigid polyurethanes, the polyol preferably possesses a hydroxyl number from about 200 to about 1000. In producing semi-flexible materials, the hydroxyl number is usually from about 100 to about 250. Lower hydroxyl numbers from about 32 to about 150 are usually appropriate for the polyols employed in producing flexible polyurethanes. These ranges of hydroxyl numbers are not intended to be restrictive but are merely presented as illustrative of the relatively large number of possible polyols and combinations thereof that can be employed.

The urethane-forming reaction is usually carried out in the presence of a minor amount of a catalyst comprising a tertiary amine. Suitable amine catalysts include one or more of the following: N-methylmorpholine; N-ethylmorpholine; N-octadecylmorpholine; triethylamine; tributylamine; trioctylamine; N,N,N',N' - tetramethylethylenediamine; N,N,N',N'-tetramethyl - 1,3 - butanediamine; triethanolamine; N,N - dimethylethanolamine; triisopropanolamine; N - methyldiethanolamine; bis(2-dimethylaminoethyl)ether; hexadecyldimethylamine; N,N-dimethylbenzylamine; trimethylamine; triethylenediamine (i.e., 1,4-diazabicyclo-[2.2.2] - octane); the formate and other salts of triethylenediamine, oxyalkylene adducts of the amino groups of primary and secondary amines and other such amine catalysts which are well known in the art of polyurethane manufacture. The amine catalyst may be introduced to the polyurethane-producing reaction mixture as such or as a solution in suitable carrier solvents such as diethylene glycol; dipropylene glycol; and 2-methyl-2,4-pentanediol ("hexylene glycol").

The amine catalyst is present in the final urethane-producing reaction mixture in an amount of from about 0.05 to about 3 parts by weight of active catalyst (that is, the amine exclusive of other components present in solutions thereof) per 100 parts by weight of polyol reactant.

A further advantage realized in using the above-defined high melting form of 1,2,5,6-tetrabromo-3,4-dihydroxyhexane as a flame-retarding agent in accordance with the teachings of the present invention, is that as compared with the lower melting form, it offers the further advantage of providing wider processing latitude with respect to the catalyst system. Thus, the higher melting form of Compound I may be used in reaction mixtures containing any of the aforesaid amine catalysts and at relatively low concentrations within the aforesaid range of amine catalyst. On the other hand, the lower melting form of Compound I more readily forms acidic moieties and, when employed as a flame-retardant of polyurethane polymers, it is preferably used in a reaction mixture containing higher concentrations of amine catalyst such as at least 0.15 part by weight per 100 parts by weight of polyol, and the catalyst is preferably a more highly basic amine such as triethylenediamine.

In producing polyurethanes from polyether polyols it is often desirable to include as a further component of the reaction mixture a minor amount of certain metal catalysts. Such supplementary catalysts are well known to the urethane art. For example, useful metal catalysts include organo-tin compounds, particularly tin compounds of carboxylic acids such as stannous octoate, stannous oleate, stannous acetate, stannous laurate, dibutyltin dilaurate, and other such tin salts. Additional metal catalysts are organo-compounds of other polyvalent metals such as zinc and nickel (e.g., nickel acetylacetonate), or other such metal catalysts which are well known in the art of flexible polyether urethane foam manufacture. The amount of each such metal catalyst which can be present in the polyurethane-producing reaction mixture is from about 0.05 to about 2 parts by weight per 100 parts by weight of the polyether polyol starting material.

When it is desired to provide cellular polyurethanes, the reaction mixture also includes a minor amount of a foaming or blowing agent such as water which, upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed in the process of this invention include methylene chloride, liquefied gases which have boiling points below 80° F. and above minus 60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Illustrative of the fluorocarbon blowing agents are trichloromonofluoromethane, dichlorodifluoromethane, 1,1-dichloro-1-fluoroethane, 1,1,1-trifluoro - 2 - fluoro-3,3-difluoro-4,4,4-trifluorobutane, hexafluorocyclobutene and octafluorocyclobutane. When producing flexible foams, the generally preferred method of foaming is the use of water or a combination of water plus a fluorocarbon blowing agent such as trichloromonofluoromethane. On the other hand, in producing rigid foams the blowing agent is usually one of the aforesaid halogenated compounds.

The amount of blowing agent employed in the foaming reaction will vary with factors such as the density that is desired in the foamed product. Usually, however, from about 1 to about 30 parts by weight of the blowing agent per 100 parts by weight of polyol is employed.

In producing flame-retarded cellular polyurethanes in accordance with the method of this invention, a minor amount of a foam stabilizer is also usually present as an additional component of the reaction mixture. When used, the foam stabilizer is usually a poly(siloxane-oxyalkylene) block copolymer and may be any of such copolymers described in the prior art. Generally, the block copolymers comprise (1) siloxy units having the formula, $Z_2SiO$, (2) polyether-substituted siloxy units having the formula, $Z^oO(C_nH_{2n}O)_xC_mH_{2m}Si(Z)O$, and (3) siloxy units having the formula $Z_3SiO_{1/2}$, where: Z in each instance is a monovalent hydrocarbon group having from 1 to 12 carbon atoms such as alkyl and aryl groups, in particular methyl $Z^o$ is either Z, Z—C(O) or hydrogen where Z is as aforesaid; —$C_mH_{2m}$— is a bivalent hydrocarbon radical, usually of 2 to 5 carbon atoms, that links the respective silicon atoms of the polyether-substituted siloxy units to the polyether block, $Z^oO(C_nH_{2n}O)_x$, in which $n$ has a value of from 2 to 4 and the average value of $x$ is such that the average molecular weight of the polyether block is from about 200 to about 6000. Illustrative block copolymers for use as foam stabilizers in the foaming reaction of this invention are, for example, the copolymers described in U.S. Pats. Nos. 2,834,748; 2,917,480; 3,505,377; 3,507,815; 3,563,924; and in U.S. patent application Ser. No. 109,587, filed Jan. 25, 1971, now abandoned. Such copolymer compositions are incorporated herein by reference to the aforesaid patents and application. When used, the foam stabilizer is present in the polyurethane-forming reaction mixture within the range of from about 0.2 to about 5 parts by weight or more, per 100 parts by weight of the polyol reactant.

The flame-retarded urethane polymers of the invention can take the form of foamed products, elastomers, surface coatings, castings and the like, and may be formed in accordance with any of the processing techniques known to the polyurethane art such as the "one-shot," quasi-prepolymer and prepolymer techniques. For example, in accordance with the "one-shot" process, foamed products are produced by carrying out the reaction of the polyisocyanate, polyol and Compound I simultaneously with the foaming operation. In preparing the foamed products in accordance with the quasi-prepolymer technique, the polyisocyanate is first reacted with a portion of the polyol to give a product having a high percentage of free-NCO groups (e.g., from 20 to 50 percent), and the product is subsequently foamed by reaction with additional polyol and foaming agent. In the prepolymer technique, the isocyanate is reacted with a slightly less than stoichiometric quantity of polyol to form a prepolymer having a low percentage (e.g., from 1 to 10 percent) of free-NCO groups, followed by reaction of the prepolymer with a blowing agent such as water to form the cellular material. In these various multi-stage methods, Compound I may be incorporated at any stage but is usually used in combination with the polyol reactant. Elastomers and castings are formed by reaction of the aforesaid by reaction of the aforesaid prepolymer with a cross-linking agent having reactive hydrogen such as a diamine as typically exemplified by a bis-(aminochlorophenyl)methane. Curing of the prepolymer by atmospheric moisture provides surface coatings.

The flame-retarded polyurethanes produced in accordance with the present invention are used in the same areas as conventional polyurethanes and are especially useful where fire-resistance properties are required. Thus the polymers are useful as textile interliners, cushions, paddings, packaging, gaskets, sealers, thermal insulators and the like.

The following examples are merely illustrative of the present invention and are not intended as a limitation upon the scope thereof.

In the following Example I, the melting point determinations were made using a Thomas Hoover Capillary Melting Point apparatus manufactured by Arthur H. Thomas Company, Philadelphia, Pa. The accuracy of this apparatus is ±1° C., as determined using the following melting point standards supplied by the manufacturer: vanillin (81°–83° C.); acetanilid (114°–116° C.); acetophenetidin (134°–136° C.); sulfanilamide (164.5°–166.5° C.); sulfapyridine (190°–193° C.) and caffeine (235°–237.5° C.).

EXAMPLE I

Preparation of 1,2,5,6-tetrabromo-3,4-dihydroxyhexane

To a solution of 205.3 grams (1.80 mols) of 3,4-dihydroxy-1,5-hexadiene in 200 ml. of carbon tetrachloride maintained at 5° C., there was added dropwise over a two-hour period, a solution of 575.6 grams (3.6 mols) of bromine in 300 ml. of carbon tetrachloride. During the first hour, an additional 250 ml. of carbon tetrachloride was added to facilitate stirring and, during the later stages of bromine addition, 145 ml. of methylene chloride was required to break-up the caked reaction product. After standing overnight at ambient temperature, the reaction mixture was filtered thereby providing 1,2,5,6-tetrabromo-3,4-dihydroxyhexane (636 grams) as a white solid. After standing in a vacuum desiccator over phosphorus pentoxide for five days, the solid reaction product weighed 498.9 grams. Recrystallization of this product from boiling chloroform (2800 ml.) afforded 1,2,5,6-tetrabromo-3,4-dihydroxyhexane (118.9 grams) as a white solid having a melting point of 165°–168° C. This specific high melting form of 1,2,5,6-tetrabromo-3,4-dihydroxyhexane is designated as Compound I-I, indicating that is is predominantly the high melting stereoisomer described and referred to herein as Isomer I.

Concentration of the chloroform filtrate from the above-described recrystallization step gave a tacky residue which was washed with two 50 ml. portions of cold chloroform. The washed material was then recrystallized from chloroform (200 ml.) and dried thereby providing 1,2,5,6-tetrabromo-3,4-dihydroxyhexane (93.9 grams) having a melting point of 89°–91.5° C. This particular low melting form of 1,2,5,6-tetrabromo-3,4-dihydroxyhexane is designated as Compound I-II, indicating that it is predominantly the low melting stereoisomer described and referred to herein as Isomer II.

A sample (2 grams of Compound I-I was subjected to further purification by recrystallization from benzene and two recrystallizations from chloroform. The purified material (Isomer I) had a melting point of 171.5° to 172.5° C. and, upon analysis was found to contain, on a weight percent basis: C, 16.51; H, 2.23; Br, 72.41. (Calculated for $C_6H_{10}Br_4O_2$: C, 16.61; H, 2.49; Br, 73.68.)

A sample (3 grams of Compound I-II was also subjected to further purification by recrystallization from chloroform followed by crystallization from acetone-cyclohexane and final recrystallization from benzene. The purified material (Isomer II) had a melting point of 98° to 99° C. and, upon analysis was found to contain, on a weight percent basis: C, 17.03; H, 2.34; Br, 75.81. (Calculated for $C_6H_{10}Br_4O_2$: C, 16.61; H, 2.49; Br, 73.68.)

EXAMPLES II–X

In accordance with these examples, flexible polyurethane foams were prepared by reacting and foaming a reaction mixture containing a polyether polyol, a diisocyanate, water as the source of blowing action, an amine catalyst, stannous octoate, a silicone surfactant as the foam stabilizer and, as the flame-retardants, the high and low melting forms of 1,2,5,6-tetrabromo-3,4-dihydroxyhexane, prepared in accordance with Example I, and designated Compounds I-I and I-II, respectively. Flexible polyether foams were also prepared in which either: (1) no flame-retardant was added (designated Run No. K), or (2) the prior art flame-retardant, dibromoneopentyl glycol, discussed and designated hereinabove as Compound A, was incorporated (designated Run Nos. C-1 and C-2).

In each of Examples II–X and Runs K, C-1 and C-2, the following were employed:

(a) A polyether polyol having a hydroxyl number of 56 and formed as the reaction product of glycerol and propylene oxide;

(b) A mixture of the 2,4- and 2,6-isomers of tolylene diisocyanate present in a weight ratio of 80:20, respectively, the said mixture having a index of 105 which designates that the amount of mixture employed was 105 weight percent of the stoichiometric amount required to react with total reactive hydroxyl groups present in the system; and (c) As the silicone foam-stabilizing surfactant, a polysiloxane-polyoxyalkylene block copolymer having the average structure:

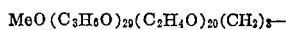
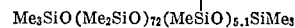

(wherein Me represents a methyl group) employed as an approximately 55 weight percent solution in a solvent medium containing about 90 and 10 weight percent, respectively, of compounds having the average formulas, $C_4H_9(OC_2H_4)_{19}(OC_3H_6)_{14}OH$ and

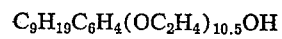

In Examples II–VIII in which Compound I-I was employed, and in Runs K, C-1 and C-2, the amine catalyst, designated herein as Amine Catalyst A, was bis-[2-(N,N-dimethylamino)ethyl]ether employed as a 70 weight percent solution in dipropylene glyocl.

In Examples IX and X in which Compound I-II was employed as the flame-retardant, the amine catalyst, designated herein as Catalyst B, was 1,4-diazabicyclo-[2.2.2]- octane (also known as triethylenediamine) employed as a 33 weight percent solution in dipropylene glycol.

The relative proportions of components present in the respectively reaction mixtures employed to produce the foams of Examples II–X and Runs K, C–1 and C–2 are set forth in Table I below wherein the relative proportions are expressed on the standardized basis of 100 parts of polyol, although the foams were produced on five times the scale. In view of their solid nature and in order to facilitate blending of components, Compounds I–I, I–II and A were predissolved in the polyether polyol. The concentration of the respective solutions and the conditions under which the initial suspensions of solids in the liquid polyol were heated for complete solubilization were as follows: Compound A, 18 weight percent solution (70° C. for 1.5 hours); Compound I–I, 6.54 weight percent solution in Examples II–VI (85° C. for 2 hours) and a 15 weight percent solution in Examples VII and VIII (70° C. for 3 hours); Compound I–II, 15 weight percent solution (45° C. for 50 minutes). As required, these respective solutions were blended with additional polyether polyol to obtain the particular relative proportions of flame-retardant indicated in Table I.

In producing the foams of Examples II–X and Runs K, C–1 and C–2, substantially the same procedure was employed which entailed the following manipulative steps: the diisocyanate, silicone surfactant and either the polyol (as in control Run K) or the above-described blend of flame-retardant and polyol, were each weighed into a ½ gallon container fitted with a baffle. The resultant mixture was stirred for 60 seconds with a high speed stirrer at 2700 r.p.m. After the mixture was allowed to stand for 15 seconds, it was stirred for an additional 15 seconds. During the latter period but after 5 seconds had elapsed, the amine catalyst and water were added as a premixed solution and, after the remaining 10-second period of stirring, the stannous octoate was added from a syringe. When the 15 seconds of stirring was completed, the mixture was quickly poured into a mold (14" x 14" x 6") whereupon the respective masses foamed. Both the cream time and rise time were recorded which terms denote the interval of time from the formation of the complete foam formulation to (1) the appearance of a creamy color in the formulation and (2) the attainment of the maximum height of the foam, respectively. The foams were allowed to stand at ambient conditions for 2 days before flammability, physical and mechanical properties were determined.

The flammability properties, determined before and after accelerated aging, were measured in accordance with standard test procedure ASTM D1692–67T, except that five samples of each foam were tested. The results are given in Table I below wherein:

"Burning extent" denotes the burned length of the foam specimen; the flammability of the foam is proportional to the burning extent as measured by the aforesaid test.

"Extinguishing time" denotes the time taken to give the specified "burning extent."

"SE" indicates that on the basis of the results obtained in the aforesaid flammability test, the foam is rated as self-extinguishing.

"B" indicates that on the basis of the results obtain in the aforesaid flammability test, at least one of the foam samples burned to such an extent that it did not qualify as a self-extinguishing material; therefore, the foam is given a burning ("B") rating.

"Humid aging" indicates that the foam specimen was subjected to heating at 120° C. for 5 hours in a steam autoclave, as specified in test method ASTM D1564–64T, section 5.1.2.

"Dry heat aging" indicates that the foam specimen was heated in an oven at 140° C. for 22 hours, as specified with respect to test method ASTM D1564–64T, sections 38–44.

TABLE I

| | Example No. (Run No.) | | | | | | | | | | | |
|---|---|---|---|---|---|---|---|---|---|---|---|---|
| | (K) | (C–1) | (C–2) | II | III | IV | V | VI | VII | VIII | IX | X |
| Foam No. | 1 | 2 | 3 | 4 | 5 | 6 | 7 | 8 | 9 | 10 | 11 | 12 |
| Foam formulation, pts. by wt.: | | | | | | | | | | | | |
| Polyol | 100 | 100 | 100 | 100 | 100 | 100 | 100 | 100 | 100 | 100 | 100 | 100 |
| Diisocyanate (index 105) | 50.0 | 51.8 | 53.5 | 50.8 | 51.1 | 51.7 | 52.2 | 52.9 | 54.0 | 55.2 | 51.9 | 54.0 |
| Water | 4.0 | 4.0 | 4.0 | 4.0 | 4.0 | 4.0 | 4.0 | 4.0 | 4.0 | 4.0 | 4.0 | 4.0 |
| Amine catalyst: | | | | | | | | | | | | |
| Catalyst A | 0.1 | 0.1 | 0.1 | 0.1 | 0.1 | 0.1 | 0.1 | 0.1 | 0.1 | 0.1 | | |
| Catalyst B | | | | | | | | | | | 1.25 | 1.25 |
| Stannous octoate | 0.275 | 0.2 | 0.2 | 0.25 | 0.25 | 0.2 | 0.2 | 0.2 | 0.3 | 0.3 | 0.2 | 0.2 |
| Silicone surfactant | 0.5 | 0.5 | 0.5 | 0.5 | 0.5 | 0.5 | 0.5 | 0.5 | 0.5 | 0.5 | 0.5 | 0.5 |
| Flame-retardant: | | | | | | | | | | | | |
| Compound I–I | | | | 2.0 | 2.8 | 4.0 | 5.0 | 7.0 | 10.0 | 13.0 | | |
| Compound I–II | | | | | | | | | | | 5 | 10 |
| Compound A [1] | | 2.5 | 5.0 | | | | | | | | | |
| Percent bromine in polymer [2] | 0 | 0.99 | 1.93 | 0.96 | 1.34 | 1.89 | 2.34 | 3.23 | 4.5 | 5.7 | 2.35 | 4.5 |
| Cream time, seconds | 7 | 7 | 7 | 7 | 7 | 7 | 7 | 7 | 9 | 10 | 3 | 3 |
| Rise time, seconds | 79 | 81 | 82 | 86 | 85 | 95 | 100 | 79 | 93 | 127 | 68 | 126 |
| Flammability: | | | | | | | | | | | | |
| Before sample conditioning: | | | | | | | | | | | | |
| Rating | B | B | SE | B | B | B | SE | SE | SE | SE | SE | SE |
| Burning extent, inches | | | 3.2 | | | | 2.3 | 3.2 | 1.1 | 1.4 | 1.5 | 2.9 |
| Extinguishing time, seconds | | | 40 | | | | 50 | 38 | 52 | 37 | 45 | 145 |
| After humid (dry heat) aging: [3] | | | | | | | | | | | | |
| Rating | B | B | SE | B | B | SE | SE | SE | SE | SE | (SE) | (B) |
| Burning extent, inches | | | 2.9 | | | 2.7 | 1.9 | 2.0 | 1.8 | 2.2 | (1.9) | |
| Extinguishing time, seconds | | | 34 | | | 35 | 24 | 24 | 31 | 24 | (51) | |
| Comments as to scorching | | | | | | No scorching observed | | | | | Scorching observed | |

[1] Not a flame-retardant of this invention; presented for the purpose of comparision.
[2] Total weight of polymer taken as combined weight of polyol, diisocyanate and flame-retardant.
[3] Flammability results after dry heat aging are indicated within parenthesis.

The results tabulated in Table I show that both the high and low melting forms of 1,2,5,6-tetrabromo-3,4-dihydroxyhexane, as exemplified by Compounds I–I and I–II, were capable of providing self-extinguishing flexible polyurethane foams. Although Foam No. 3 produced in comparative Run C–2 in which Compound A (dibromoneopentyl glycol) was used as the flame-retardant was also self-extinguishing, the foam was tight (as indicated by the air porosity measurement given in Table II, set forth and discussed hereinbelow). The results of Table I also show that, as between the two forms of 1,2,5,6-tetrabromo-3,4-dihydroxyhexane, the higher melting form (Compound I-I) possesses the further desirable property of providing self-extinguishing flexible foams which are scorch-free. Particularly noteworthy is the fact that the higher melting form provided scorch-free flexible foams even when used in amounts sufficient to incorporate the relatively high bromine content of 5.7 weight percent as in Example VIII. On the other hand, although the lower melting form of 1,2,5,6-tetrabromo-3,4-dihydroxyhexane used in Examples IX and X provided self-extinguishing flexible foams, such foams were scorched to a considerable extent thereby limiting their use to applications Compression set at 90% constant deflection was determined in accordance with sections 12-18 of ASTM D1564-64T, the amount of compression set ($C_t$) being expressed as a percent of the original specimen thickness and is reported as the median of three test specimens for each foam sample.

These additional properties of the foams produced in accordance with Runs K, C-1, C-2 and Examples II-VI of Table I above are reported in the following Table II wherein the parts by weight of flame-retardant and percent bromine in the polymer correspond to the values given in Table I.

TABLE II

| | Example No. (Run No.) | | | | | | | |
|---|---|---|---|---|---|---|---|---|
| | (K) | (C-1) | (C-2) | II | III | IV | V | VI |
| Foam No. | 1 | 2 | 3 | 4 | 5 | 6 | 7 | 8 |
| Flame-retardant, pts. by wt.: | | | | | | | | |
| Compound I-I | | | | 2.0 | 2.8 | 4.0 | 5.0 | 7.0 |
| Compound A | | 2.5 | 5.0 | | | | | |
| Percent bromine in polymer | 0 | 0.99 | 1.93 | 0.96 | 1.34 | .189 | 2.34 | 3.23 |
| Foam properties: | | | | | | | | |
| Density, lbs./ft.³ | 1.53 | 1.56 | 1.57 | 1.55 | 1.55 | 1.54 | 1.56 | 1.55 |
| Air porosity, ft.³/min./ft.² | 114 | 114 | 66 | 114 | 124 | 124 | 122 | 113 |
| Tensile strength, p.s.i. | 15.4 | 16.0 | 18.2 | 15.8 | 16.0 | 14.4 | 15.3 | 16.1 |
| Elongation, percent | 198 | 189 | 202 | 207 | 210 | 201 | 207 | 218 |
| Tear resistance, lbs./in. | 2.43 | 2.42 | 2.49 | 2.37 | 2.37 | 2.32 | 2.33 | 2.35 |
| 4-inch ILD, lbs./50 in.²: | | | | | | | | |
| 25% deflection | 35 | 35 | 41 | 32 | 33 | 30 | 31 | 31 |
| 65% deflection | 64 | 64 | 74 | 62 | 63 | 59 | 61 | 60 |
| 25% return | 23 | 23 | 26 | 21 | 21 | 20 | 20 | 20 |
| Return value | 66.1 | 64.9 | 63.3 | 65.2 | 64.4 | 66.0 | 65.0 | 64.7 |
| Load ratio | 1.83 | 1.82 | 1.80 | 1.93 | 1.93 | 1.97 | 1.96 | 1.95 |
| 90% compression set, percent | 4.3 | 4.6 | 7.6 | 6.3 | 7.0 | 7.5 | 8.8 | 10.8 | where self-extinguishing characteristics are required and discoloration due to scorching is only a secondary consideration such as when used in molded articles.

In addition to the flammability properties given in Table I, various physical and mechanical properties of the foams produced in the above-described Examples II-VI and Runs K, C-1 and C-2 were determined. These additional properties are given in Table II hereinbelow and were measured by subjecting the foam samples to the following standardized test procedures:

Air porosity, which is a comparative measurement of the degree of openness of the cells of flexible foams, was determined in accordance with the following test procedure: The test specimen of foam (4" x 4" x ½") is compressed between two pieces of flanged plastic tubing (2¼" I.D.) of an air porosity assembly maintained under an air pressure of 14.7 pounds. Air is drawn through the thickness (½") of the foam specimen at a velocity controlled to maintain a differential presure of 0.1 inch of water across the thickness dimension. The air flow necessary to develop the requisite pressure differential is recorded and the air flow per unit area of the foam specimen is reported as the air porosity of the foam.

Density was measured as described in sections 68-73 of ASTM D1564-64T except that the test specimens had nominal dimensions of 4" x 4" x 1".

Tensile strength and Ultimate elongation were measured in accordance with sections 81-87 (suffix T) of ASTM D1564-64T, after exposure of the foam specimens to the above-described dry heat aging conditions, and are reported as the median values of three test specimens for each foam sample.

Tear resistance was measured as described in suffix G of ASTM D1564-64T and is reported as the median value of three test specimens for each foam sample.

Indentation load deflection (ILD values) to 25% and 65% deflection were measured in accordance with ASTM D1564-64T, sections 19-25 (Method A), except that the dimensions of the foam specimens employed were 12" x 12" x 4". The return value is the percentage ratio of the load required to support the return 25% indentation after one minute as compared to the load required to support the initial 25% indentation after one minute. The load ratio is the ratio of the 65% and 25% ILD values, respectively.

Comparison of the properties set fourth in Table II of the self-extinguishing foam produced in Run C-2 in which Compound A (dibromoneopentyl glycol) was used, with the control foam of Run K shows that Compound A caused a marked decrease in air porosity, thereby indicating substantial impairment of foam breathability. On the other hand, such a marked decrease in air porosity was not exhibited by the foams of Examples V and VI to which self-extinguishing characteristics were imparted by incorporation of the high melting form (Compound I-I) of 1,2,5,6-tetrabromo-3,4-dihydroxyhexane.

In the following Table III, flammability data and observations as to discoloration due to scorching are summarized for flexible polyurethane foams prepared from foam formulations containing: (1) the same components in substantially the same relative proportions as employed in producing the control foam of Run K of Table I with appropriate adjustment of the relative proportion of diisocyanate to meet the requirements of the above-defined index 105, and (2) various flame-retardants in amounts sufficient to provide foams containing bromine in amounts of about 1.5, 2, 2.5, 3, 3.5 and 4 weight percent, based on the combined weight of the diisocyanate, polyol and flame-retardant. The flame-retardants employed in producing the foams on which the data of Table III are based are: the high melting form of 1,2,5,6-tetrabromo-3,4-dihydroxyhexane (Compound I-I), dibromoneopentyl glycol (Compound A), trans-2,3-dibromo-2-butene-1,4-diol (Compound B) and 2,3-dibromopropanol (Compound C). These foams were prepared using the above-described manipulative steps. The flammability ratings and burning extents of the respective foams were measured in accordance with ASTM D1692-67T. The oxygen index values given in Table III indicate the quantity of oxygen necessary to just sustain combustion of the foam samples, and were measured using the procedure standardized as ASTM D2863 and employing General Electric's Oxygen Index Tester. The observations as to discoloration due to scoring are qualitative and are based on visual inspection of the coloration of the center of the foam buns.

TABLE III

| Flame-retardant, compound | I-I | A[1] | B[1] | C[1] |
|---|---|---|---|---|
| Weight percent bromine in foam:[2] | Oxygen Index[3] | | | |
| 1.5 | 0.204 | 0.207 | | 0.212 |
| 2 | 0.209 | 0.214 | 0.204 | 0.216 |
| 2.5 | [4] 0.211 | 0.207 | | 0.219 |
| 3 | 0.214 | 0.209 | 0.204 | 0.219 |
| 3.5 | 0.212 | 0.212 | 0.207 | 0.226 |
| 4 | 0.212 | 0.214 | 0.207 | 0.219 |
| | Flammability Rating (Burning Extent, Inches) | | | |
| 1.5 | B | B | B | B |
| 2 | B | SE (3.4) | B | SE (2.6) |
| 2.5 | SE (3.5) | B | B | SE (2.1) |
| 3 | SE (1.9) | SE (3.8) | B | SE (1.9) |
| 3.5 | SE (2.0) | SE (2.4) | B | SE (1.9) |
| 4 | SE (2.1) | SE (2.4) | SE (3.9) | SE (1.8) |
| Discoloration | ([5]) | Slight | None | Severe |

[1] Not a flame-retardant of the present invention; presented for comparison only.
[2] Total weight of foam taken as combined weight of polyol, diisocyanate and flame-retardant employed in producing the foam.
[3] Oxygen Index figures are based on two determinations; unless indicated otherwise each determination resulted in the indicated value.
[4] Average of two determinations (0.212 and 0.209).
[5] Very slight.

The data of Table III show that: (1) overall the flammability properties of the foams produced using Compound I-I and Compound A are comparable, although as shown by the results of Table II, Compound A causes a marked decrease in foam breathability; (2) Compound B provided scorch-free foams but was a relatively poor flame-retardant; and (3) Compound C was effective in providing self-extinguishing foams of high oxygen index and relatively low burning extent but such foams were severely scorched.

What is claimed is:

1. A flame-retarded polyurethane which comprises the reaction product of 1,2,5,6-tetrabromo-3,4-dihydroxyhexane having a melting point within the range between about 120° C. and about 172.5° C., a polyether polyol and an organic polyisocyanate, said polyurethane containing between about 1 and about 20 weight percent bromine.

2. A flame-retarded cellular polyurethane composition which comprises the product formed by reacting and foaming a reaction mixture containing (1) an organic polyisocyanate, (2) 1,2,5,6-tetrabromo-3,4-dihydroxyhexane having a melting point of at least about 120° C. and not higher than about 172.5° C., (3) a polyol different from said 1,2,5,6-tetrabromo-3,4-dihydroxyhexane and (4) a blowing agent, said 1,2,5,6-tetrabromo-3,4-dihydroxyhexane being present in said reaction mixture in an amount sufficient to provide a polyurethane product having a bromine content of between about 2 and about 20 weight percent, based on the combined weight of (1), (2) and (3).

3. A flame-retarded composition as defined in claim 2 wherein said polyol is a polyether polyol.

4. A flame-retarded composition as defined in claim 2 wherein said polyol is a polyester polyol.

5. A flame-retarded composition as defined in claim 2 wherein said polyol is a lactone polyol.

6. A flame-retarded composition as defined in claim 2 wherein said polyol is a phosphorus-containing polyol.

7. A flame-retarded cellular polyurethane as defined in claim 2 wherein said reaction mixture contains a catalyst comprising a tertiary amine.

8. A flame-retarded polyurethane foam which comprises the product formed by reacting and foaming a reaction mixture containing: (1) an organic polyisocyanate, (2) a polyether polyol, (3) 1,2,5,6-tetrabromo-3,4-dihydroxyhexane having a melting point within the range of between about 120° C. and about 172.5° C., (4) a blowing agent and (5) a tertiary amine catalyst for the polyurethane-forming reaction, said 1,2,5,6-tetrabromo-3,4-dihydroxyhexane being present in said reaction mixture in an amount sufficient to provide in said polyurethane product a bromine content of between about 2 and about 20 weight percent, based on the combined weight of (1), (2) and (3).

9. A self-extinguishing polyurethane foam which comprises the product formed by reacting and foaming a reaction mixture containing: (1) an organic polyisocyanate, (2) a polyether polyol having a hydroxyl number between about 32 and about 150, (3) 1,2,5,6-tetrabromo-3,4-dihydroxyhexane having a melting point within the range of between about 120° C. and about 172.5° C., (4) a blowing agent comprising water, (5) a tertiary amine catalyst for the polyurethane-forming reaction and (6) a foam stabilizer, said 1,2,5,6-tetrabromo-3,4-dihydroxyhexane being present in said reaction mixture in an amount sufficient to provide a polyurethane product having a bromine content of between about 2.3 and about 20 weight percent, based on the combined weight of (1), (2) and (3).

10. A polyurethane foam as defined in claim 9 in which said 1,2,5,6-tetrabromo-3,4-dihydroxyhexane has a melting point of at least 150° C. and is present in said reaction mixture in an amount to provide in said foam a bromine content of not more than about 10 weight percent.

References Cited
UNITED STATES PATENTS
| | | | |
|---|---|---|---|
| 3,465,031 | 9/1969 | Stephenson | 106—15 |
| 3,391,200 | 7/1968 | Dowbenko | 260—45.95 |
| 3,507,933 | 4/1970 | Larsen et al. | 260—633 |
| 3,542,740 | 11/1970 | Pumpelly et al. | 260—77.5 |
| 3,639,304 | 2/1971 | Raley, Jr. | 260—2.5 |

FOREIGN PATENTS
| | | | |
|---|---|---|---|
| 895,966 | 5/1962 | Great Britain | 260—2.5 |
| 889,720 | 2/1962 | Great Britain | 260—2.5 |
| 1,063,605 | 3/1967 | Great Britain | 260—77.5 |

OTHER REFERENCES
Journal of the Chemical Society Abstracts, 64, 240–241 (1893).
Chemical Abstracts, 26, 4303 (1932).

DONALD E. CZAJA, Primary Examiner

E. C. RZUCIDLO, Assistant Examiner

U.S. Cl. X.R.

106—15 FP; 252—8.1; 260—2.5 FP, 45.95, 77.5 SS, Dig. 24

PO-1050
(5/69)

UNITED STATES PATENT OFFICE
CERTIFICATE OF CORRECTION

Patent No. 3,779,953      Dated December 18, 1973

Inventor(s) Anthony Joseph Papa and William Robert Proops

It is certified that error appears in the above-identified patent and that said Letters Patent are hereby corrected as shown below:

Column 2, line 38, "and a" should read -- as a --. Column 4, line 27, "usch" should read -- such --. Column 8, line 57, after "methyl" read -- ; --. Column 9, lines 25-26, delete the second occurrence of "by reaction of the aforesaid"; line 74, the first occurrence of "is" should read -- it --. Column 10, line 12, after "grams" read -- ) --; line 19, after "grams" read -- ) --; line 50, "a" should read -- an --. Column 11, line 4, "respectively" should read -- respective --. Column 12, line 9, "resolts" should read -- results --. Columns 13-14, Table II, under the column headed "IV" and opposite the legend "Percent bromine in polymer", for ".189" read -- 1.89 --. Column 14, line 73, "scoring" should read -- scorching --. Column 15, Table III, heading "B]" should read -- $B^1$ --.

Signed and sealed this 14th day of May 1974.

(SEAL)
Attest:

EDWARD M.FLETCHER,JR.
Attesting Officer

C. MARSHALL DANN
Commissioner of Patents